United States Patent
Mochizuki (10) Patent No.: US 8,656,485 B2
(45) Date of Patent: Feb. 18, 2014

(54) PROJECTION DISPLAY DEVICE AND METHOD FOR CONTROLLING PROJECTION DISPLAY DEVICE

(75) Inventor: Yuji Mochizuki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 98 days.

(21) Appl. No.: 13/337,372

(22) Filed: Dec. 27, 2011

(65) Prior Publication Data

US 2012/0169760 A1    Jul. 5, 2012

(30) Foreign Application Priority Data

Dec. 29, 2010  (JP) ................ 2010-294370

(51) Int. Cl.
*H04L 9/32*    (2006.01)

(52) U.S. Cl.
USPC ............. 726/17; 713/170; 713/182; 345/618; 345/156

(58) Field of Classification Search
None
See application file for complete search history.

(56) References Cited

U.S. PATENT DOCUMENTS

| | | | | |
|---|---|---|---|---|
| 5,537,127 | A * | 7/1996 | Jingu | 345/1.3 |
| 7,136,667 | B2 * | 11/2006 | Lilja et al. | 455/522 |
| 8,037,269 | B2 * | 10/2011 | Okamoto et al. | 711/163 |
| 8,093,534 | B2 * | 1/2012 | Komada et al. | 219/443.1 |
| 2006/0174133 | A1 * | 8/2006 | Obata | 713/182 |
| 2011/0001701 | A1 * | 1/2011 | Nakano | 345/157 |
| 2011/0016175 | A1 * | 1/2011 | Mitsuoka et al. | 709/203 |
| 2011/0234616 | A1 * | 9/2011 | Lee | 345/589 |
| 2013/0002924 | A1 * | 1/2013 | Nakajima et al. | 348/333.02 |
| 2013/0113736 | A1 * | 5/2013 | Kornilovsky et al. | 345/173 |

FOREIGN PATENT DOCUMENTS

| | | |
|---|---|---|
| JP | 5-119896 A | 5/1993 |
| JP | 2002-229608 A | 8/2002 |

* cited by examiner

*Primary Examiner* — Fikremariam A Yalew (74) *Attorney, Agent, or Firm* — ALG Intellectual Property, LLC (57) ABSTRACT

A projection display device that operates, in case that the second authentication information which is input does not match the first authentication information which is stored, operates in the second operation mode in which the projection display device projects in a state that an operation to change the environmental setting information is disabled to be received.

19 Claims, 5 Drawing Sheets

PROJECTION DISPLAY DEVICE AND METHOD FOR CONTROLLING PROJECTION DISPLAY DEVICE

The entire disclosure of Japanese Patent Application No. 2010-294370, filed Dec. 29, 2010 is expressly incorporated by reference herein.

BACKGROUND

1. Technical Field

The present invention relates to projection display devices and methods for controlling a projection display device.

2. Related Art

Some projection display devices (projectors) have a protect function implemented by means of password authentication. As such a protect function, there is a protect function of locking an input when the user performs the inputting of a password unsuccessfully three times in a row and requiring the user to turn on the device and do the process again, and, when the user forgets the password, requiring the user to acquire an unlock code which is provided when the user makes contact with a support center and is confirmed to be a customer and allowing the user to unlock the password by using the unlock code. Moreover, when the user performs the inputting of a password unsuccessfully many times in a row, the protect function maintains a complete locked state in which the user cannot use the device at all unless the user takes a predetermined procedure.

Furthermore, as a protect function which is not limited to the projection display device, there is a protect function of determining whether or not an input is a simple inputting error when the contents of the input do not match a keyword and regarding the input as a correct input when determining that it is a simple error (see, for example, JP-A-5-119896). Moreover, there is a protect function of prohibiting the inputting of a password when the user unsuccessfully performs the inputting of a password continuously and allowing the user to input a password again after a lapse of a set time (see, for example, JP-A-2002-229608).

However, in an existing configuration in which the user cannot use the device when password authentication is unsuccessfully performed, it takes a good amount of time for even an authorized user to become able to use the projection display device. This causes inconvenience to the authorized user.

On the other hand, in a configuration in which, when it is determined that an input is a simple error, the input is regarded as a correct input, when a combination of numerals that are input from a remote controller is used as a password as in the projection display device, it is difficult to determine whether or not an input is a simple inputting error, and, even when the device is being stolen, there is a possibility that an unauthorized third party can use the device. This decreases security level.

Moreover, in a configuration in which the inputting of a password is permitted every time after a lapse of a set time, even an authorized user cannot use the device as long as the user continues to input an incorrect password, and there is a danger that, if the device is being stolen, a third party may become able to use the device when the third party finds the password in the course of time.

SUMMARY

An advantage of some aspects of the invention is to solve at least part of the problems described above and the invention can be implemented as the following forms or aspects.

A projection display device according to an aspect of the invention includes: a storing unit in which setting information including environmental setting information indicating a usage environment and first authentication information are stored; an image projecting unit that projects an image based on the setting information; an inputting unit that receives an input operation; and a controlling unit that operates the projection display device in an operation mode based on a result of an authentication determination as to whether or not second authentication information which is input by the inputting unit matches the first authentication information, in case that the second authentication information does not match the first authentication information, the controlling unit operates the projection display device in a second operation mode in which the image projection unit projects in a state that an operation to change the environmental setting information is disabled to be received by the inputting unit.

According to an aspect of the invention, when authentication of the authentication information is successfully performed, the projection display device is operated in the function unrestricted mode in which a change of the environmental setting information is accepted and an image is projected based on the changed setting information, and, when authentication of the authentication information is unsuccessfully performed, the projection display device is operated in the function restricted mode in which a change of the environmental setting information is disabled and an image is projected based on the setting information. Therefore, even when authentication of the authentication information is unsuccessfully performed, the projection display device can be used in a state in which the projection display device is not being stolen, and it is possible to make it difficult to use the projection display device in a state in which the projection display device is being stolen.

In one aspect of the invention, it is possible to set an operation mode in which the projection display device is started in accordance with the authentication result at the start of use and appropriately regulate the start of use in a state in which the projection display device is being stolen.

In one aspect of the invention, it is possible to allow the authorized user to make a few authentication information inputting errors.

In one aspect of the invention, it is possible to reflect the user request.

In one aspect of the invention, it is possible to make the projection display device unusable forcefully when the usage environment is changed while the projection display device is operating in the function restricted mode and prohibit the use of the projection display device with reliability in a state in which the projection display device is being stolen.

In one aspect of the invention, when authentication of the input authentication information is successfully performed, the projection display device operates in the function unrestricted mode in which a change of the environmental setting information is accepted and an image is projected based on the changed setting information, and, when authentication of the input authentication information is unsuccessfully performed, the projection display device operates in the function restricted mode in which a change of the environmental setting information is disabled and an image is projected based on the setting information. Therefore, even when authentication of the input authentication information is unsuccessfully performed, the projection display device can be used in a state in which the projection display device is not being stolen, and it is possible to make it difficult to use the projection display device in a state in which the projection display device is being stolen.

According to the aspects of the invention, even when authentication is unsuccessfully performed, the projection display device can be used in a state in which the projection display device is not being stolen.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the drawings.

Figure 1:
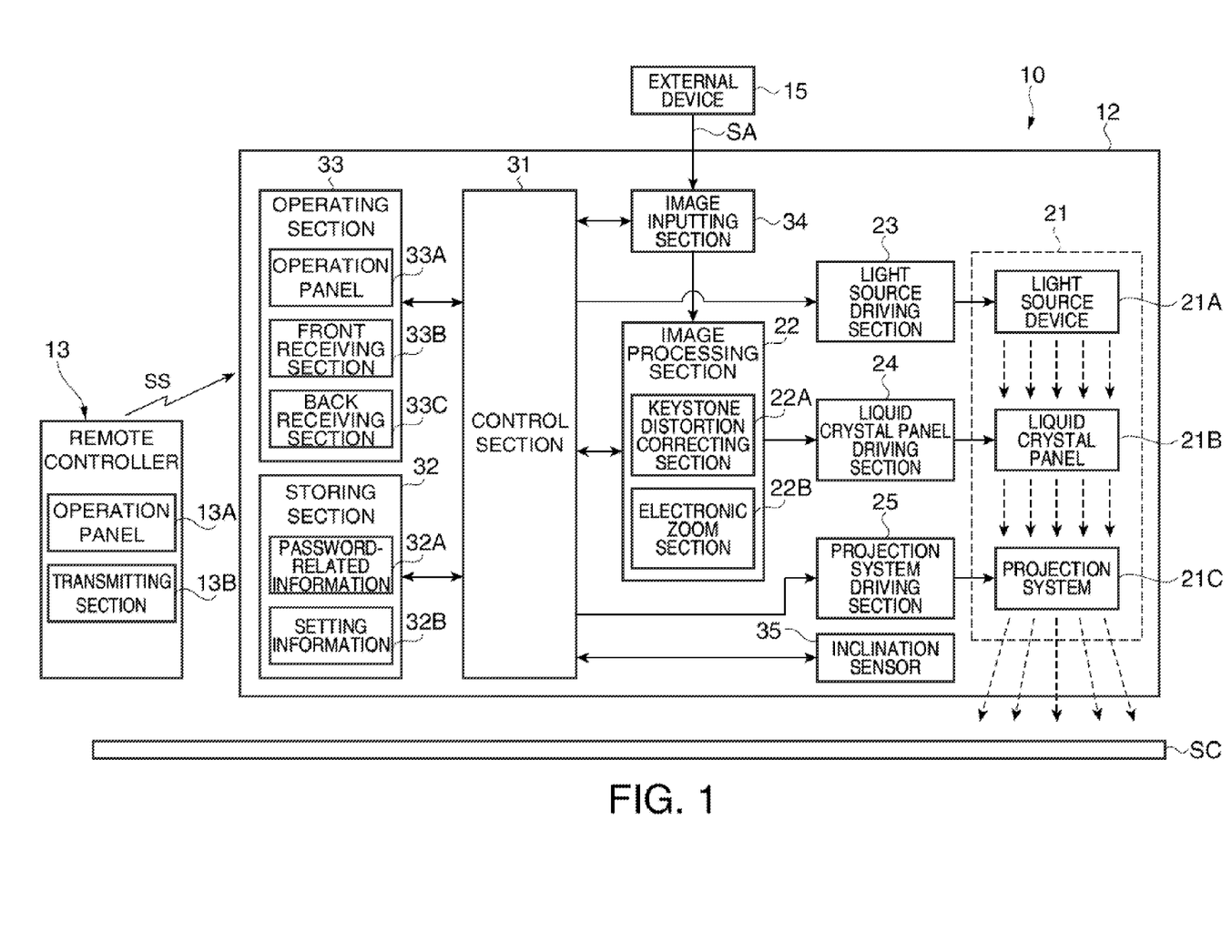
FIG. 1 is a diagram showing a functional configuration of a projector according to an embodiment of the invention.

FIG. 1 is a diagram showing a functional configuration of a projector (a projection display device) 10 according to the embodiment of the invention.

The projector 10 is a device that projects an image light representing an image and displays an image (a projected image) onto a screen SC which is a projection surface. The projector 10 includes a device main body 12 that houses principal parts and a remote controller 13 which is held by the user, the remote controller (hereinafter referred to as the remote control) 13 with which the user can operate the projector 10.

In the device main body 12, an image projecting section 21 that forms mainly an optical system and an image processing section 22 that forms an image processing system are provided.

The image projecting section 21 forms an optical system that projects an image onto the screen SC and includes a light source device 21A functioning as a light source, a liquid crystal panel (also called a liquid crystal light valve) 21B, and a projection system 21C.

The light source device 21A includes a xenon lamp, an ultra-high pressure mercury lamp, an LED (light emitting diode), or the like, and emits an illuminating light by being driven by a light source driving section 23. The liquid crystal panel 21B is a transmissive liquid crystal panel in which a plurality of pixels are arranged in a matrix, and modulates the illuminating light from the light source device 21A into an image light representing an image by changing the light transmittance of each pixel by the driving of a liquid crystal panel driving section 24. Here, the image projecting section 21 corresponds to an image projecting unit.

The projection system 21C enlarges and projects the light that has been modulated into the image light by the liquid crystal panel 21B, and has optical components such as a projection lens. A projection system driving section 25 is a driving section that adjusts the zoom magnification and the focal length of the projection system 21C.

Here, when the projector 10 is formed as a 3LCD projector, three liquid crystal panels 21B corresponding to three colors: R, G, and B and mirrors, a prism, and the like that separate and combine the light of the light source device 21A are provided.

In this embodiment, for convenience of explanation, one liquid crystal panel 21B is provided. Incidentally, a wide range of publicly known configurations can be applied to the image projecting section 21.

A control section 31 functions as a computer that controls the individual sections of the projector 10 by executing a control program product stored in a storing section 32. In this embodiment, the control section 31 and the image processing section 22 function as a display control section that controls display of the liquid crystal panel 21B. Here, the control section 31 corresponds to a controlling unit.

In addition to the control program product, various data is stored in the storing section 32, and password-related information 32A, setting information 32B, and the like are stored in the storing section 32. Moreover, in the device main body 12 of the projector 10, an operating section 33, an image inputting section 34, and an inclination sensor (also referred to as a tilt sensor) 35 are provided. Here, the storing section 32 corresponds to a storing unit.

The operating section 33 includes an operation panel 33A having a plurality of operators and receiving sections 33B and 33C that receive a signal (a remote control signal) SS transmitted from the remote control 13 as an input operation, and notifies the control section 31 of a user operation via the operation panel 33A and the receiving sections 33B and 33C. The operators of the operation panel 33A include a switch by which an instruction to turn on/off the power is given. Here, the operating section 33 corresponds to an inputting unit.

The installation state of the projector 10 of this configuration can be chosen from front/ceiling-hung/rear installation states. In the front installation, the projector 10 is placed on the floor (including a stand) in front of the screen SC. In the ceiling-hung installation, the projector 10 is hung from the ceiling. In the rear installation, the projector 10 is placed at the rear of the screen SC.

The receiving sections 33B and 33C are placed in different positions so that the receiving sections 33B and 33C can be operated by the remote control 13 in any of the front/ceiling-hung/rear installation states. Specifically, the receiving section 33B is a front receiving section (a first receiving section) that is placed at the front of the projector 10, and the receiving section 33C is a back receiving section (a second receiving section) that is placed at the back of the projector 10.

The image inputting section 34 receives an input of a picture signal from an external device (such as a personal computer or a DVD player) 15 which is a picture source device connected by cable to the device main body 12. The image inputting section 34 includes a picture signal input terminal such as an HDMI (High-Definition Multimedia Interface) input terminal and a network terminal for connection with a network system.

The image processing section 22 performs various kinds of image processing on a picture signal SA under control of the control section 31, and performs frame rate (frame frequency) conversion processing, OSD (on screen display) processing, image processing related to image quality and pictures, and other processing by digital processing. Here, the image processing section 22 corresponds to an image processing unit.

Moreover, in the image processing section 22, a keystone distortion correcting section 22A that corrects keystone distortion of the projected image which occurs when the image is projected in a state in which a projection axis of the projector 10 is tilted relative to the screen SC and an electronic zoom section 22B that changes the zoom magnification of the projected image by image processing are provided.

The keystone distortion correcting section 22A performs keystone distortion correction processing (vertical keystone distortion correction processing) based on the keystone distortion correction amount which is one of the control information output from the control section 31. The keystone distortion correction amount is calculated by the control section 31 based on an inclination angle (corresponding to an inclination angle of the device main body 12) of the projector 10, the inclination angle detected by the inclination sensor 35. As a result, the projector 10 is provided with an automatic keystone distortion correction function of automatically correcting keystone distortion in accordance with the inclination of the projector 10. Incidentally, publicly known configurations can be applied to the keystone distortion correcting section 22A and calculation of the keystone distortion correction amount.

The electronic zoom section 22B performs electronic zoom processing by which the zoom magnification (enlargement ratio and reduction ratio) of the projected image is changed based on electronic zoom information which is one of the control information output from the control section 31. Publicly known configurations can also be applied to the electronic zoom section 22B.

As described above, the inclination sensor 35 is used for the automatic keystone distortion correction function and outputs a vertical inclination angle to the control section 31 under control of the control section 31.

The remote control 13 is formed as a small remote control that can be held and easily carried about by the user. The remote control 13 includes an operation panel 13A having a plurality of operators and a transmitting section 13B that transmits a signal (a remote control signal) SS based on the operation performed on the operation panel 13A, and notifies the projector 10 of the user operation from a distance. The operators of the operation panel 13A include, as a means of performing an input operation, a switch by which an instruction to turn on/off the power is given, operation keys (numeric keys) which are used to input a password (authentication information), and the like.

The projector 10 of this configuration has a protect function which is one of antitheft functions and is performed by means of password authentication.

As described above, the password-related information 32A is stored in the storing section 32. In the password-related information 32A, at least a preset authorized password (first authentication information) is described. When the projector 10 is turned on, the control section 31 makes the projector 10 display a password input screen, urges the user to input a password as an input operation, conducts authentication as to whether or not the password (second authentication information) thus input matches the authorized password (the first authentication information) which is registered in advance in the password-related information 32A, and imposes a given restriction when the validity of the password is not authenticated (hereinafter, this processing will be referred to as protect processing).

Figure 2:
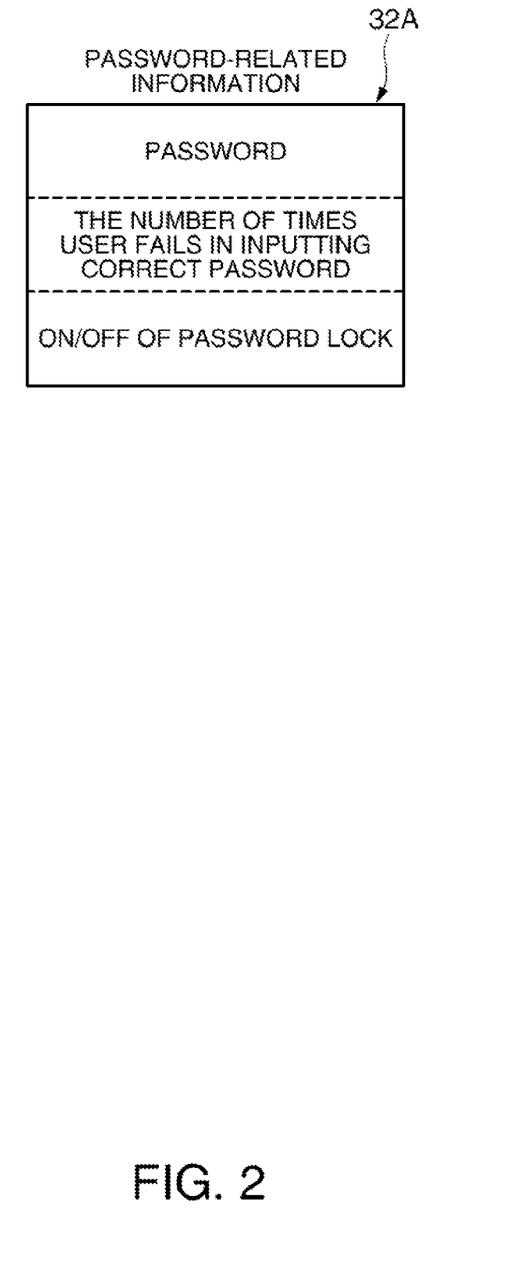
FIG. 2 is a diagram showing the contents of password-related information.

FIG. 2 shows the contents of the password-related information 32A.

As shown in this drawing, in the password-related information 32A, an authorized password, the number of times the user inputs an incorrect password in a row (the number of times the user fails in inputting a correct password), and password lock ON/OFF information are stored. When the projector 10 is turned on, the control section 31 refers to the ON/OFF information and, when password lock is ON, starts the protect processing described above. Moreover, when password authentication is unsuccessfully performed, the control section 31 updates the number of times the user inputs an incorrect password in a row; when password authentication is successfully performed, the control section 31 resets the number of times the user inputs an incorrect password in a row to zero.

In the projector 10, when password authentication is successfully performed, the control section 31 controls the individual sections of the projector 10 based on the setting information 32B stored in the storing section 32, and makes the projector 10 display an image corresponding to the picture signal which is input via the image inputting section 34 onto the screen SC via the image processing section 22 and the image projecting section 21.

Moreover, when password authentication is successfully performed, the control section 31 controls the image processing section 22, when a menu display instruction is input by the operation performed on the remote control 13 or the operating section 33, to display a menu screen on the screen SC, and accepts a change of the password-related information 32A and a change of the setting information 32B by the operation performed on the operating section 33 while the menu screen is displayed. That is, the control section also functions as a setting unit that sets the password-related information 32A and the setting information 32B.

Figure 3:
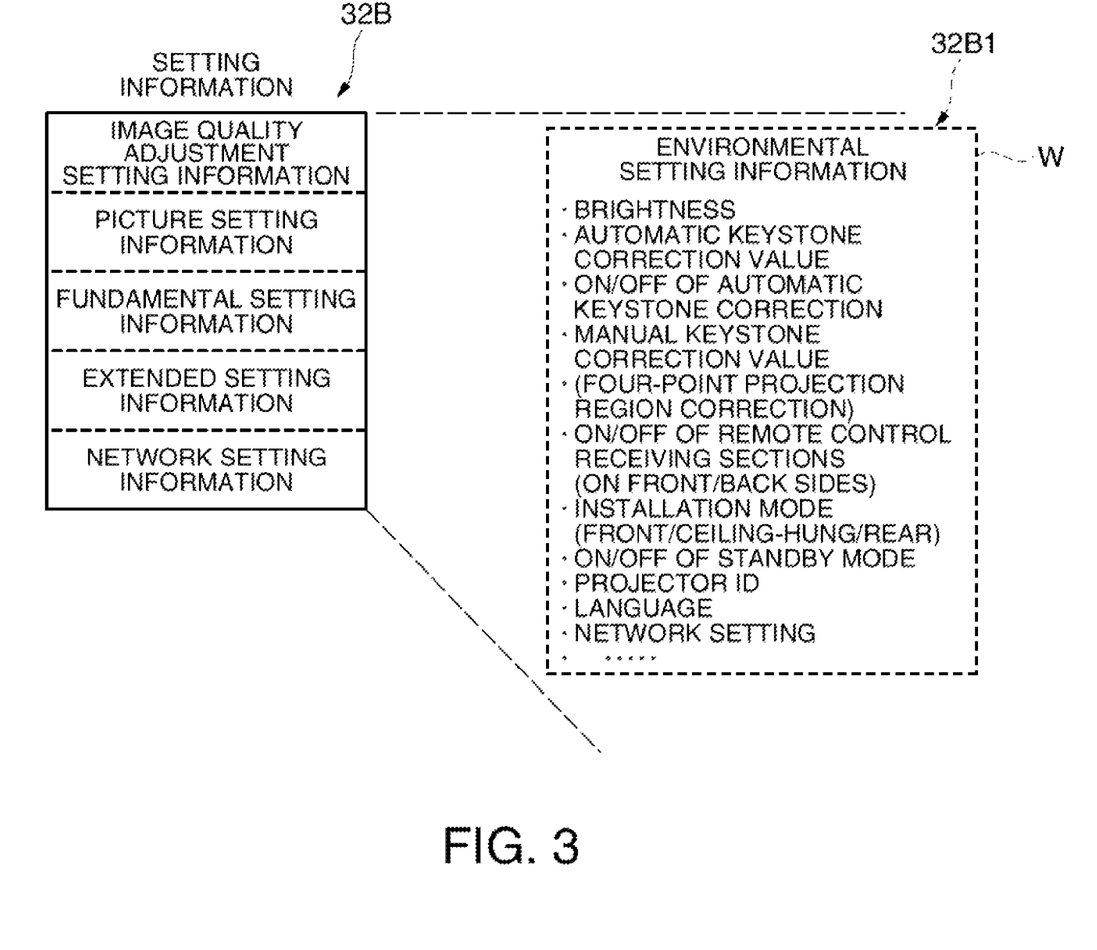
FIG. 3 is a diagram showing the contents of setting information.

FIG. 3 shows the contents of the setting information 32B. Incidentally, in the drawing, the setting information surrounded with a frame W is setting information (hereinafter referred to as environmental setting information) 32B1 of all the setting information 32B, the setting information 32B1 indicating a usage environment.

The detailed description will be given below. The setting information 32B of the projector 10 is classified into "image quality adjustment setting information", "picture setting information", "fundamental setting information", "extended setting information", "network setting information", and the like. As the setting information in these classifications, information corresponding to publicly known setting options can be used. For example, "image quality adjustment setting information" is information on setting options related to the image quality such as the brightness, color, contrast, color strength, etc. of a picture, and "picture setting information" is information on setting options related to an input picture such as an input resolution and tracking.

Moreover, "fundamental setting information" is information on setting options related to fundamental settings such as automatic keystone distortion correction (correction by automatic keystone distortion correction), ON/OFF of automatic keystone distortion correction, manual keystone distortion correction (keystone distortion correction performed by specifying four corners of a projected picture (also called four-point projection region correction)), ON/OFF of the remote control receiving sections (on the front/back sides), etc.

Furthermore, "extended setting information" is information on setting options related to settings other than fundamental settings, the settings such as an installation mode (front/ceiling-hung/rear), ON/OFF of a standby mode (a mode of operating network monitoring/control function in a standby state), a projector ID (identification information used when a plurality of projectors are used and remote control operation is performed individually on the projectors), a display language, and the like.

In addition, "network setting information" is information on various setting options for connection with the network system.

Of these information, the information which is set in accordance with a usage environment such as the brightness of an audio-visual room, the positional relationship with the screen SC, selection as to whether or not the projector 10 is connected to the network, and the like is shown as the environmental setting information 32B1 in the frame W.

Incidentally, in the protect function of a common projector, the projector 10 is made unusable when password authentication is unsuccessfully performed. As a result, even when the projector 10 is not being stolen, the projector 10 cannot be used when authentication is unsuccessfully performed. This imposes an inconvenience on the authorized user who desires to use the projector right now.

Therefore, in this configuration, by performing, when authentication is unsuccessfully performed, protect processing (first protect processing) by which only environmental lock which makes it impossible to change the environmental setting information 32B1 is performed, the projector is made usable in a state in which it is not being stolen (in a usage environment) and cannot be used easily in a state in which it is being stolen, that is, a state in which it is in a different usage environment.

Figure 4:
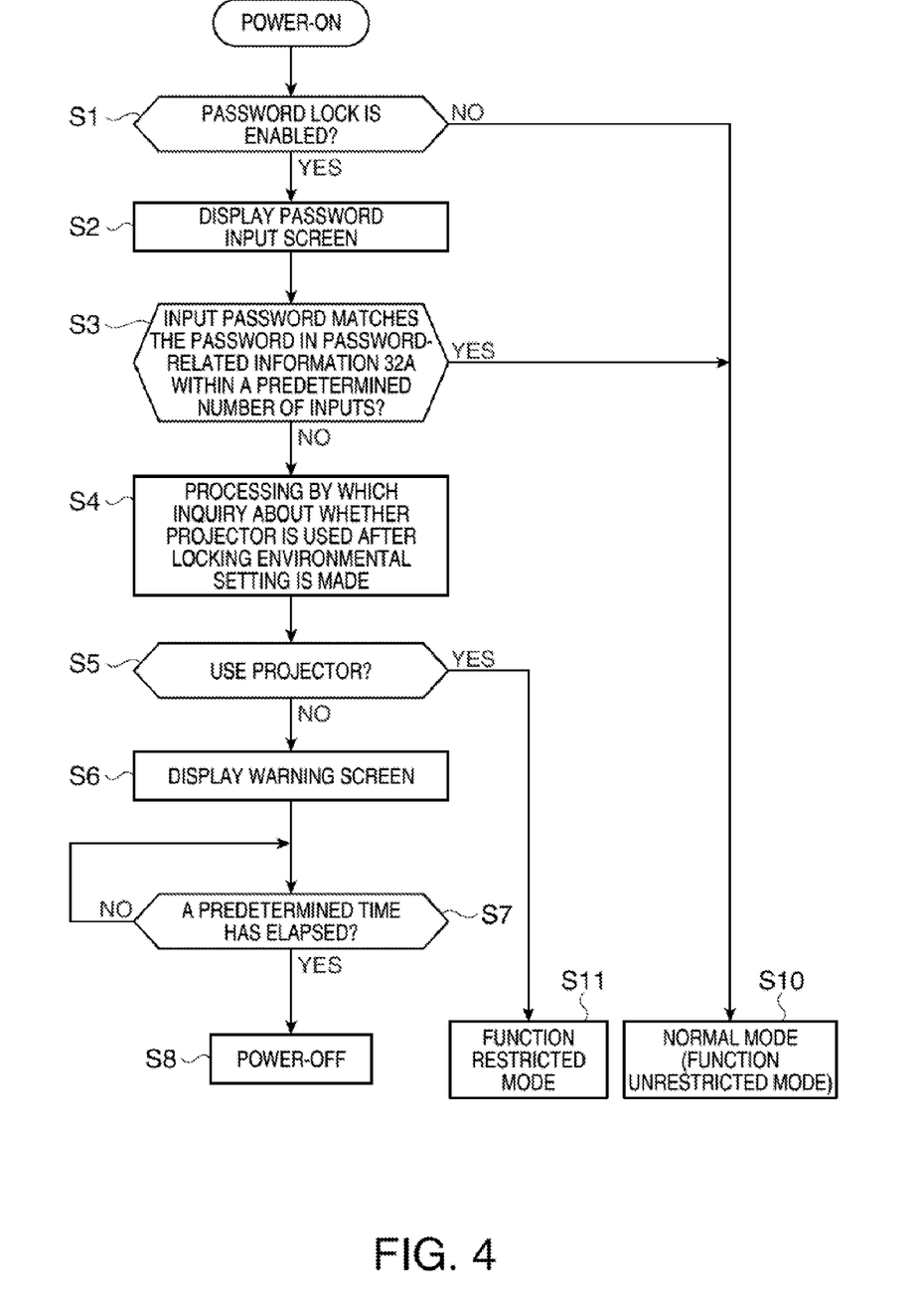
FIG. 4 is a flowchart showing protect processing (first protect processing).

FIG. 4 is a flowchart showing the protect processing (the first protect processing) of the projector 10. Incidentally, this protect processing is performed by the control section 31 when the projector 10 is turned on by the operation performed on the remote control 13 or the operating section 33.

First, the control section 31 refers to the password-related information 32A stored in the storing section 32 and determines whether or not password lock is ON (enabled) (step S1). If password lock is ON (enabled), the control section 31 proceeds to processing in step S2; if password lock is OFF (disabled), the control section 31 starts the projector 10 in such a way that the projector 10 operates in the normal mode (first operation mode) (step S10).

Here, the normal mode that is the first operation mode is an operation mode in which no lock is applied and the projector 10 can perform operations such as changing the setting information 32B and projecting an image corresponding to an input picture by accepting the operation performed on the remote control 13 and the operating section 33. The normal mode corresponds to a function unrestricted mode in which no restriction is imposed on the function and operation.

In step S2, the control section 31 makes the projector 10 display a password input screen by using the image processing section 22 and urges the user to input a password. Then, the control section 31 determines whether or not the input password matches the password in the password-related information 32A within a predetermined number of inputs (in this embodiment, within three inputs) (step S3). If the input password matches the password in the password-related information 32A within the predetermined number of inputs (step S3: YES), the control section 31 proceeds to processing in step S10.

On the other hand, if the input password does not match the password in the password-related information 32A within the predetermined number of inputs (step S3: NO), the control section 31 performs inquiry processing (in this embodiment, message display processing) by which an inquiry about whether the projector 10 is used after locking the environmental setting is made (step S4). Here, the inquiry processing is a process that projects a message image by image projecting section 21 to receive an input operation through the operating section 33.

Then, if the user performs a input operation indicating that the user will not use the projector 10 (step S5: NO), the control section 31 performs warning screen display processing by which a notification that the operation of the projector 10 is stopped is made (step S6), waits until a predetermined time elapses (step S7), and controls the projector 10 so that the projector 10 is turned off (step S8).

That is, when password authentication is unsuccessfully performed and the user's intention of not using the projector 10 is confirmed, the projector 10 is made unusable.

On the other hand, if the user performs a input operation indicating that the user will use the projector 10 (step S5: YES), the control section 31 starts the projector 10 so that the projector 10 operates in the function restricted mode (second operation mode) (step S11).

The function restricted mode that is the second operation mode is an operation mode which is different from the normal mode (the function unrestricted mode) in that a change of the environmental setting information 32B1 is disabled. In other respects, the function restricted mode does not impose restrictions on the function and operation. Thus, in the function restricted mode, the projector 10 can perform operations such as changing the setting information 32B (the setting information other than the environmental setting information 32B1) and projecting an image corresponding to an input picture by accepting the operation performed on the remote control 13 and the operating section 33.

That is, when password authentication is unsuccessfully performed and the user's intention of using the projector 10 is confirmed, the projector 10 is made usable in a state in which the environmental setting is locked.

In a state in which the environmental setting is locked as described above, the projector 10 can be used as usual unless the usage environment of the projector 10 is changed; however, the following problems arise if the usage environment of the projector 10 is changed.

For example, when the positional relationship with the screen SC or the installation state (front/ceiling-hung/rear) is changed, a projected image of the projector 10 is not appropriately displayed on the screen SC or the remote control operation is not accepted due to an OFF state of the receiving section 33B or 33C. Moreover, when the brightness of an audio-visual room is changed, an appropriate image is not displayed due to insufficient brightness of the projected image.

Furthermore, when the country or the network environment in which the projector 10 is used is changed, it becomes difficult to understand the contents of display because various kinds of display are performed in a language which is different from the language used in the country in which the projector 10 is currently used and make the projector 10 display a projected image via the network.

In this way, in the function restricted mode, while the projector 10 is made usable if the projector 10 is not being stolen, it is possible to make it difficult to use the projector 10 if the projector 10 is being stolen and the usage environment is changed.

Figure 5:
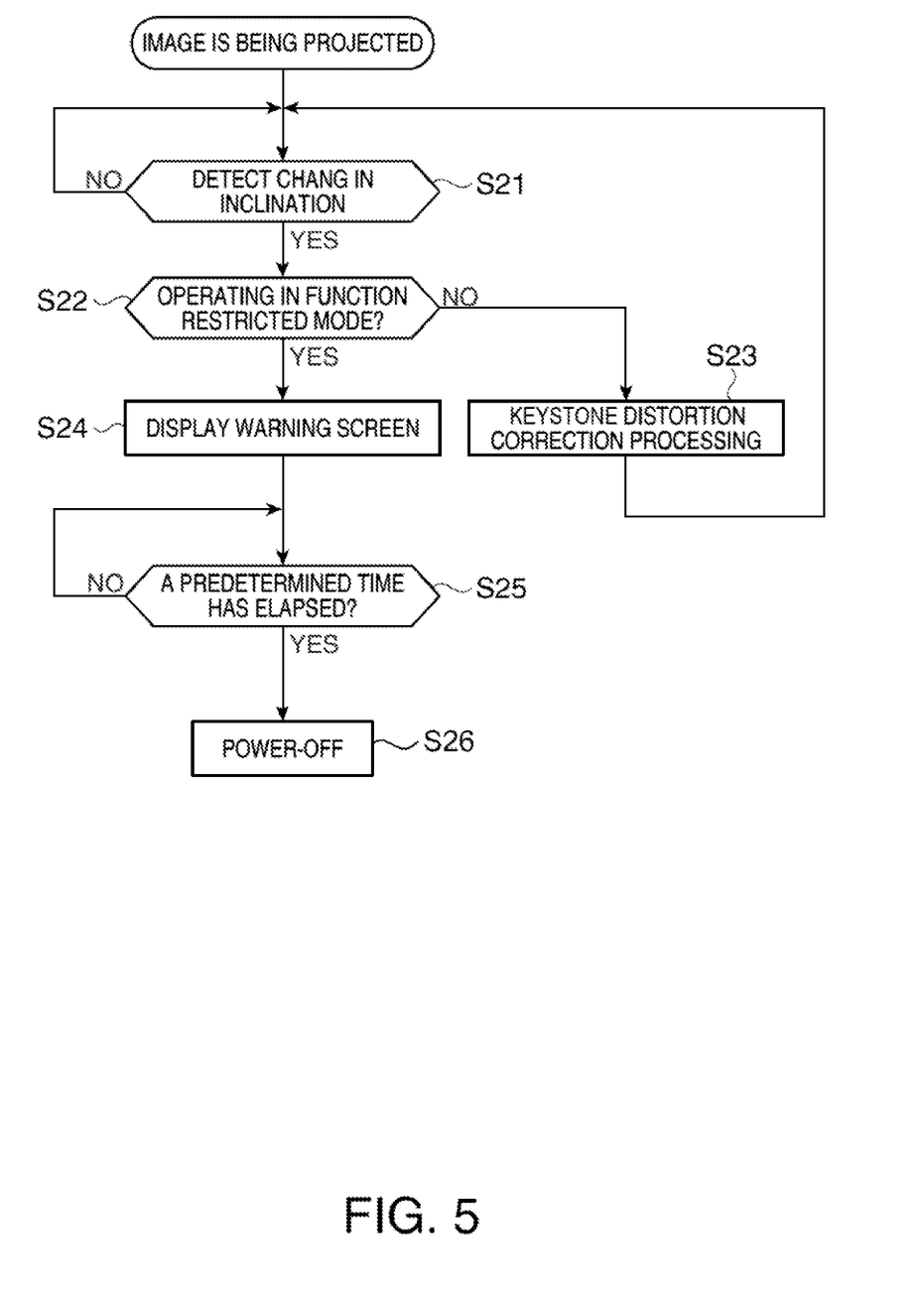
FIG. 5 is a flowchart showing another protect processing (second protect processing).

Next, another protect processing (second protect processing) which is performed while the power supply to the projector 10 is on and the projector 10 is projecting a projected image will be described.

FIG. 5 is a flowchart showing the protect processing (the second protect processing).

First, while the projector 10 is operating (projecting a projected image) after being started, the control section 31 monitors an inclination angle which is detected by the inclination sensor 35 (step S21). Then, when the control section 31 detects a change in the inclination (step S21: YES), the control section 31 determines whether or not the projector 10 is operating in the function restricted mode (step S22). If the projector 10 is not operating in the function restricted mode (step S22: NO), the control section 31 proceeds to processing in step S23.

In step S23, if automatic keystone distortion correction is ON (enabled), the control section 31 performs keystone distortion correction processing and then proceeds to processing in step S21.

Incidentally, if automatic keystone distortion correction is OFF (disabled), the control section 31 proceeds to processing in step S21 without performing keystone distortion correction processing.

Here, a change in the inclination which is detected in step S21 described above is a change in the inclination angle obtained when the last keystone distortion correction was performed, and the information on the last inclination angle is stored in the storing section 32.

On the other hand, if it is determined in step S22 that the projector 10 is operating in the function restricted mode (step S22: YES), the control section 31 performs warning screen display processing by which a notification that the operation of the projector 10 is stopped is made (step S24), waits until a predetermined time elapses (step S25), and controls the projector 10 so that the projector 10 is turned off (step S26).

That is, if a change in the usage environment of the projector 10 is detected, the projector 10 is made unusable in the function restricted mode. As a result, when the projector 10 is stolen and the usage environment is changed, it is possible to prohibit the use of the projector 10.

In this configuration, since the inclination sensor 35 used for keystone distortion correction is also used as an environmental change detecting unit that detects a change in an environment, it is possible to prohibit the use of the projector 10 actively at the time of environmental change without an increase in the number of parts.

As described above, according to this embodiment, when password authentication is successfully performed, the projector 10 operates in the normal mode (the function unrestricted mode) in which the projector 10 accepts a change of the environmental setting information 32B1 and projects an image based on the changed setting information 32B; when password authentication is unsuccessfully performed, the projector 10 operates in the function restricted mode in which a change of the environmental setting information 32B1 is disabled and the projector 10 projects an image based on the setting information 32B. Therefore, even when authentication is unsuccessfully performed, in the same usage environment, that is, in a state in which the projector 10 is not being stolen, the projector 10 can be used; however, it is possible to make it difficult to use the projector 10 if the projector 10 is being stolen and is in a different usage environment.

This makes it possible to eliminate the inconvenience of not allowing the authorized user to use the projector 10 for a long period when the authorized user forgets a password and at the same time take adequate measures against theft.

In addition, since password authentication processing is performed when the projector 10 is turned on and the projector 10 is started in the normal mode or the function restricted mode in accordance with the authentication result, it is possible to set an operation mode in which the projector 10 is started in accordance with the authentication result at the start of use and appropriately regulate the start of use of the projector 10 in a state in which the projector 10 is being stolen.

Furthermore, when the validity of an input password is not authenticated continuously, the control section 31 starts the projector 10 in the function restricted mode. This makes it possible to allow the authorized user to make a few password inputting errors.

Moreover, when authentication is unsuccessfully performed, the control section 31 performs processing (corresponding to step S4 of FIG. 4) by which an inquiry about whether the mode is made to transition to the function restricted mode is made, and operates the projector 10 in the function restricted mode or stops the operation of the projector 10 in accordance with the inquiry result. This makes it possible to reflect the user request. For example, when authentication is unsuccessfully performed as a result of the authorized user making a password inputting error, the operation is stopped, which allows the user to perform the procedure again from password authentication by turning on the projector 10.

Furthermore, in this embodiment, the inclination sensor 35 functioning as an environmental change detecting unit is provided, and, when a change in the inclination angle, the change corresponding to a change in the usage environment, is detected by the inclination sensor 35, in the normal mode, keystone distortion correction is performed; in the function restricted mode, the operation is stopped. This makes it possible to make the projector 10 unusable forcefully when the usage environment is changed while the projector 10 is operating in the function restricted mode and prohibit the use of the projector 10 with reliability in a state in which the projector 10 is being stolen.

It is to be understood that the embodiment described above is a mere example of the invention and any modifications and applications are possible within the scope of the subject matter of the invention.

For example, in the embodiment described above, a case in which a password is used as authentication information has been described; however, the invention is not limited thereto, and a wide range of publicly known authentication information can be used.

Moreover, the projector 10 described above is a projector that projects an image onto the screen SC by using a transmissive liquid crystal panel 21B; however, the projector 10 may be a projector using a reflective liquid crystal panel or may be a DMD projector using a digital mirror device. Furthermore, the projector 10 is not limited to a projector that projects a color image by using one liquid crystal panel 21B; the invention can be applied to a 3LCD projector that projects a color image by using three liquid crystal panels 21B, a single-chip DMD projector provided with a color wheel, and a 3DMD projector.

Moreover, in the embodiment described above, the projector 10 includes the inclination sensor 35 as the environmental change detecting unit, and detects the change in the inclination angle of the projector 10 by the inclination sensor 35, the change corresponding to the change in the usage environment, however for example, the projector 10 may include a capturing device that captures an projection image which is projected by the image projecting section 21, and detect a change in the inclination of the projection image obtained from a plurality of capturing images which contain the projection image.

Moreover, in the embodiment described above, the projector 10 detects the change in the inclination angle of the projector 10 by the inclination sensor 35 as the change in the usage environment that the environmental setting information 32B1 indicates, however for example, the projector 10 may include a GPS (Global Positioning System) device that enables to acquire a position information indicating a position where the projector 10 exists, and detect a change in a country and a place where the projector 10 is used, as the change in the usage environment that the environmental setting information 32B1 indicates, based on the position information acquired by the GPS device and a mapping information related to the position information. Furthermore, the projector 10 may detect a change in display language contained in the environmental setting information 32B1 as the change in the usage environment.

Moreover, the specific forms of implementation of the individual functional sections of the projector 10 described above are not limited to particular forms. That is, hardware corresponding to each of the individual functional sections does not always have to be implemented. It goes without saying that a configuration can be adopted in which one processor executes a program product and thereby realizes the functions of a plurality of functional sections. Furthermore, part of the functions realized by software in the embodiment described above may be realized by hardware, or part of the functions realized by hardware may be realized by software. In addition, the specific details of the configuration of the projector 10 can be changed arbitrarily without departing from the spirit of the invention. Moreover, the invention can be realized as a program product that is executed by such a device.

What is claimed is:

1. A projection display device comprising:
   a storing unit in which setting information including environmental setting information indicating a usage environment and a preset authorized password are stored;
   an image projecting unit that projects an image based on the setting information;
   an inputting unit that receives a user operation; and
   a controlling unit that performs an authentication that whether or not a password which is input as user operation matches the preset authorized password, and operates the projection display device in an operation mode based on a result of the authentication,
   wherein in case that the password which is input matches the preset authorized password, the controlling unit operates the projection display device in a normal mode in which the image projection unit projects the image in a state that an operation to change the environmental setting information as user operation can be received, and
   in case that the password which is input does not match the preset authorized password, the controlling unit operates the projection display device in a function restricted mode in which the image projection unit projects the image in a state that an operation to change the environmental setting information as user operation is disabled to be received,
   wherein the environmental setting information includes information which is set in accordance with a usage environment, the usage environment including at least one of a brightness of an audio-visual room, a positional relationship with a screen, and a connection to a network.

2. A projection display device comprising:
   a storing unit in which setting information including environmental setting information indicating a usage environment and first authentication information are stored;
   an image projecting unit that projects an image based on the setting information;
   an inputting unit that receives an input operation; and
   a controlling unit that operates the projection display device in an operation mode based on a result of an authentication determination as to whether or not second authentication information which is input by the inputting unit matches the first authentication information,
   wherein in case that the second authentication information does not match the first authentication information, the controlling unit operates the projection display device in a second operation mode in which the image projection unit projects in a state that an operation to change the environmental setting information is disabled to be received by the inputting unit,
   wherein the environmental setting information includes information which is set in accordance with a usage environment, the usage environment including at least one of a brightness of an audio-visual room, a positional relationship with a screen, and a connection to a network.

3. The projection display device according to claim 2, wherein
   in case that the second authentication information matches the first authentication information, the controlling unit operates the projection display device in a first operation mode in which the image projection unit projects in a state that an operation to change the environmental setting information can be received by the inputting unit.

4. The projection display device according to claim 2, wherein
   the controlling unit performs the authentication determination in case that the projection display device is turned on, and operates the projection display device in the second operation mode in case that the second authentication information does not match the first authentication information.

5. The projection display device according to claim 2, wherein
   in case that the second authentication information which is input by the inputting unit does not match the first authentication information a predetermined number of times in a row, the controlling unit operates the projection display device in the second operation mode.

6. The projection display device according to claim 2, wherein
   in case that the second authentication information which is input by the inputting unit does not match the first authentication information a predetermined number of times in a row, the controlling unit determines whether or not the projection display device is operated in the second operation mode based on the input operation that is received by the inputting unit, and
   stops the operation of the projection display device in case that the controlling unit determines that the projection display device is not operated in the second operation mode.

7. The projection display device according to claim 6, wherein
   the controlling unit controls the image projecting unit to project a message image by the image projecting unit to receive the input operation.

8. The projection display device according to claim 2, further comprising:
   an environmental change detecting unit that detects a change in the usage environment,
   wherein the controlling unit stops the operation of the projection display device in case that the environmental change detecting unit detects a change in the usage environment and the projection display device is operated in the second operation mode.

9. The projection display device according to claim 8, wherein
   the environmental change detecting unit detects a change in the inclination angle of the projection display device as the change in the usage environment.

10. The projection display device according to claim 8, further comprising:

an image processing unit that performs keystone distortion correction processing which corrects an inclination of the image, wherein the image processing unit performs the keystone distortion correction processing in that case the environmental change detecting unit detects a change in the usage environment and the projection display device is not operated in the second operation mode.

11. A method for controlling a projection display device in which setting information including environmental setting information indicating a usage environment and first authentication information are stored, the method comprising:

receiving an input operation;

performing an authentication determination that whether or not second authentication information that is input as the input operation matches the first authentication information; and controlling the projection display device to operate in a second operation mode in which the image projection unit projects in a state that an operation to change the environmental setting information is disabled to be received in case that the second authentication information does not match the first authentication information, wherein the environmental setting information includes information which is set in accordance with a usage environment, the usage environment including at least one of a brightness of an audio-visual room, a positional relationship with a screen, and a connection to a network.

12. The method according to claim 11, in case that the second authentication information matches the first authentication information, controlling the projection display device to operate in a first operation mode in which the image projection unit projects in a state that an operation to change the environmental setting information can be received as the input operation.

13. The method according to claim 11, in case that the projection display device is turned on, performing the authentication determination, and in case that the second authentication information does not match the first authentication information, controlling the projection display device to operate in the second operation mode.

14. The method according to claim 11, in case that the second authentication information does not match the first authentication information a predetermined number of times in a row, controlling the projection display device to operate in the second operation mode.

15. The method according to claim 11, in case that the second authentication information does not match the first authentication information a predetermined number of times in a row, determining whether or not the projection display device is operated in the second operation mode based on the input operation that is received, and in case that the projection display device is not operated in the second operation mode, stopping the operation of the projection display device.

16. The method according to claim 15, further comprising the step of:

projecting a message image for receiving the input operation.

17. The method according to claim 11, further comprising the steps of:

detecting a change in the usage environment;

in case that the change in the usage environment is detected and the projection display device is operated in the second operation mode, stopping operation of the projection display device.

18. The method according to claim 17, detecting a change in an inclination angle of the projection display device as the change in the usage environment.

19. The method according to claim 18, further comprising the steps of:

performing keystone distortion correction processing which corrects an inclination of the image;

in case that the change in the inclination angle is detected and the projection display device is not operated in the second operation mode, performing the keystone distortion correction processing.

\* \* \* \* \*